(12) United States Patent
Kim et al.

(10) Patent No.: US 9,204,084 B2
(45) Date of Patent: Dec. 1, 2015

(54) CONTENT RECORDING CONTROL METHOD FOR PEERS, AND A DEVICE THEREFOR

(75) Inventors: Mun-Jo Kim, Suwon-si (KR); Eun-Hee Rhim, Yongin-si (KR); Kwang-Kee Lee, Seoul (KR); In-chul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 642 days.

(21) Appl. No.: 12/865,035

(22) PCT Filed: Jan. 23, 2009

(86) PCT No.: PCT/KR2009/000359
§ 371 (c)(1),
(2), (4) Date: Jul. 28, 2010

(87) PCT Pub. No.: WO2009/096684
PCT Pub. Date: Aug. 6, 2009

(65) Prior Publication Data
US 2010/0332655 A1    Dec. 30, 2010

Related U.S. Application Data

(60) Provisional application No. 61/024,314, filed on Jan. 29, 2008, provisional application No. 61/026,292, filed on Feb. 5, 2008.

(51) Int. Cl.
*G06F 15/173* (2006.01)
*H04N 5/765* (2006.01)
*H04N 7/173* (2011.01)
(Continued)

(52) U.S. Cl.
CPC ............ *H04N 5/765* (2013.01); *H04L 65/4076*
(2013.01); *H04N 7/17318* (2013.01); *H04N 21/4135* (2013.01); *H04N 21/4227* (2013.01);
(Continued)

(58) Field of Classification Search
USPC .................................................. 709/223, 224
See application file for complete search history.

(56) References Cited

U.S. PATENT DOCUMENTS 5,959,623 A    9/1999  van Hoff et al.
6,002,393 A   12/1999  Hite et al.
(Continued)

FOREIGN PATENT DOCUMENTS

CN    1744691 A    3/2006
CN    1781085 A    5/2006
(Continued)

OTHER PUBLICATIONS

International Search Report issued Aug. 27, 2009 in International Application No. PCT/KR09/000372.
(Continued)

*Primary Examiner* — Adnan Mirza
(74) *Attorney, Agent, or Firm* — Sughrue Mion, PLLC

(57) ABSTRACT

A method and apparatus for controlling content recording for a buddy of a management server are provided. The method includes: receiving a recording request message for the buddy according to an external input; determining whether a local recording apparatus of the buddy is in a recording state; and selectively sending a recording start message to a recording apparatus on a network, different from the local recording apparatus of the buddy, according to a result of the determining.

15 Claims, 5 Drawing Sheets

(51) Int. Cl.
  *H04N 21/41* (2011.01)
  *H04N 21/4227* (2011.01)
  *H04N 21/433* (2011.01)
  *H04N 21/4788* (2011.01)
  *H04L 29/06* (2006.01)

(52) U.S. Cl.
  CPC ....... *H04N 21/4334* (2013.01); *H04N 21/4788* (2013.01)

(56) References Cited

U.S. PATENT DOCUMENTS

| | | |
|---|---|---|
| 6,029,045 A | 2/2000 | Picco et al. |
| 6,141,010 A | 10/2000 | Hoyle |
| 6,169,542 B1 | 1/2001 | Hooks et al. |
| 6,177,931 B1 | 1/2001 | Alexander et al. |
| 6,240,555 B1 | 5/2001 | Shoff et al. |
| 6,282,713 B1 | 8/2001 | Kitsukawa et al. |
| 6,415,438 B1 | 7/2002 | Blackketter et al. |
| 6,425,127 B1 | 7/2002 | Bates et al. |
| 6,513,069 B1 | 1/2003 | Abato et al. |
| 6,530,082 B1 | 3/2003 | Del Sesto et al. |
| 6,668,378 B2 | 12/2003 | Leak et al. |
| 6,698,020 B1 | 2/2004 | Zigmond et al. |
| 6,738,978 B1 | 5/2004 | Hendricks et al. |
| 6,766,426 B1 | 7/2004 | Sugiyama |
| 7,079,176 B1 | 7/2006 | Freeman et al. |
| 7,134,132 B1 | 11/2006 | Ngo et al. |
| 7,150,030 B1 | 12/2006 | Eldering et al. |
| 7,222,155 B1 | 5/2007 | Gebhardt et al. |
| 7,263,711 B1 | 8/2007 | Estipona |
| 7,444,659 B2 | 10/2008 | Lemmons |
| 7,694,318 B2 | 4/2010 | Konig et al. |
| 7,802,276 B2 | 9/2010 | Swix et al. |
| 7,849,135 B2 | 12/2010 | Agrawal et al. |
| 2002/0038383 A1 | 3/2002 | Ullman et al. |
| 2002/0083441 A1 | 6/2002 | Flickinger et al. |
| 2002/0083445 A1 | 6/2002 | Flickinger et al. |
| 2002/0144262 A1 | 10/2002 | Plotnick et al. |
| 2002/0156909 A1 | 10/2002 | Harrington |
| 2002/0162115 A1 | 10/2002 | Bruckner et al. |
| 2002/0184091 A1 | 12/2002 | Pudar |
| 2002/0194595 A1 | 12/2002 | Miller et al. |
| 2003/0056219 A1 | 3/2003 | Reichardt et al. |
| 2003/0101454 A1 | 5/2003 | Ozer et al. |
| 2003/0126607 A1* | 7/2003 | Phillips et al. ................. 725/55 |
| 2003/0145338 A1 | 7/2003 | Harrington |
| 2003/0149975 A1 | 8/2003 | Eldering et al. |
| 2003/0177490 A1 | 9/2003 | Hoshino et al. |
| 2003/0219041 A1 | 11/2003 | Oh |
| 2003/0231854 A1 | 12/2003 | Derrenberger |
| 2004/0194130 A1 | 9/2004 | Konig et al. |
| 2004/0194131 A1 | 9/2004 | Ellis et al. |
| 2004/0236844 A1 | 11/2004 | Kocherlakota |
| 2005/0028195 A1 | 2/2005 | Feinleib et al. |
| 2005/0039205 A1 | 2/2005 | Riedl |
| 2005/0044361 A1 | 2/2005 | Chang et al. |
| 2005/0120386 A1 | 6/2005 | Stone |
| 2005/0177421 A1 | 8/2005 | Fujimoto |
| 2005/0227678 A1 | 10/2005 | Agrawal et al. |
| 2005/0235318 A1 | 10/2005 | Grauch et al. |
| 2005/0251690 A1 | 11/2005 | Kuno et al. |
| 2005/0266835 A1 | 12/2005 | Agrawal et al. |
| 2006/0041596 A1 | 2/2006 | Stirbu et al. |
| 2006/0093325 A1 | 5/2006 | Imai et al. |
| 2006/0126551 A1 | 6/2006 | Delaunay et al. |
| 2006/0200534 A1 | 9/2006 | Nagai et al. |
| 2006/0217072 A1 | 9/2006 | Poyhonen et al. |
| 2006/0236352 A1 | 10/2006 | Scott, III |
| 2007/0039033 A1 | 2/2007 | Ota |
| 2007/0042737 A1 | 2/2007 | Peusens |
| 2007/0064637 A1 | 3/2007 | Lee et al. |
| 2007/0064712 A1 | 3/2007 | Lee et al. |
| 2007/0124359 A1 | 5/2007 | Hwang et al. |
| 2007/0127377 A1 | 6/2007 | Brocke et al. |
| 2007/0157281 A1 | 7/2007 | Ellis et al. |
| 2007/0226761 A1 | 9/2007 | Zalewski et al. |
| 2007/0233879 A1 | 10/2007 | Woods et al. |
| 2007/0234207 A1 | 10/2007 | Turakhia |
| 2007/0249367 A1 | 10/2007 | Sato et al. |
| 2007/0265932 A1 | 11/2007 | Im et al. |
| 2008/0002690 A1 | 1/2008 | Ver Steeg et al. |
| 2008/0114861 A1 | 5/2008 | Gildred |
| 2008/0127259 A1 | 5/2008 | Hong et al. |
| 2008/0133650 A1 | 6/2008 | Saarimaki et al. |
| 2008/0134236 A1 | 6/2008 | Iijima et al. |
| 2008/0168496 A1 | 7/2008 | Lee et al. |
| 2008/0256232 A1 | 10/2008 | Fleury et al. |
| 2009/0138441 A1 | 5/2009 | Valentine et al. |
| 2010/0211636 A1* | 8/2010 | Starkenburg et al. ......... 709/203 |

FOREIGN PATENT DOCUMENTS

| | | |
|---|---|---|
| JP | 2000349833 A | 12/2000 |
| JP | 2001-211410 A | 8/2001 |
| JP | 200788896 A | 4/2007 |
| KR | 2001-0049666 A | 6/2001 |
| KR | 2003-0091396 A | 12/2003 |
| KR | 1020050020165 A | 3/2005 |
| KR | 1020050022631 A | 3/2005 |
| KR | 10-2006-0048848 A | 5/2006 |
| KR | 1020060046678 A | 5/2006 |
| KR | 10-2006-0073071 A | 6/2006 |
| KR | 1020060059583 A | 6/2006 |
| KR | 1020060135270 A | 12/2006 |
| KR | 1020070011442 A | 1/2007 |
| KR | 1020070048922 A | 5/2007 |
| KR | 1020070049044 A | 5/2007 |
| KR | 1020070065501 A | 6/2007 |
| KR | 1020070066616 A | 6/2007 |
| KR | 1020070094567 A | 9/2007 |
| KR | 10-2007-0100966 A | 10/2007 |
| KR | 100940981 B1 | 2/2010 |
| WO | WO 9853611 | 11/1998 |
| WO | 2007/056077 A2 | 5/2007 |
| WO | 2007/096815 A1 | 8/2007 |

OTHER PUBLICATIONS

U.S. Final Office Action issued Aug. 15, 2011 in corresponding U.S. Appl. No. 12/361,137.
U.S. Non-Final Office Action issued Mar. 31, 2011 in corresponding U.S. Appl. No. 12/361,137.
U.S. Non-Final Office Action issued Nov. 8, 2011 in corresponding U.S. Appl. No. 12/360,287.
U.S. Non-Final Office Action issued on Mar. 28, 2011 in corresponding U.S. Appl. No. 12/360,287.
Office Action dated Apr. 13, 2012, issued by the U.S. Patent and Trademark Office in U.S. Appl. No. 12/361,137.
Office Action dated Mar. 26, 2012, issued by the U.S. Patent and Trademark Office in U.S. Appl. No. 12/360,287.
Communication dated Feb. 29, 2012, issued by the State Intellectual Property Office of P.R. China in counterpart Chinese Application No. 200980103346.1.
European Search Report issued Jul. 7, 2011 in counterpart European Patent Application No. 09705414.2.
European Search Report issued Jul. 25, 2011 in counterpart European Patent Application No. 09704986.0.
Communication dated Sep. 6, 2012 from the State Intellectual Property Office of P.R. China in a counterpart application No. 200980103346.1.
Office Action issued Jun. 6, 2012 by the State Intellectual Property Office of the People's Republic of China in counterpart Chinese Application No. 200980103346.1.
Communication from the Indonesian Intellectual Property Office dated Sep. 4, 2012, in a counterpart application No. W-00201002921.
Office Action, dated May 27, 2013, issued by the Indonesian Patent Office in counterpart Indonesian Patent Application No. W-00201002922.
Communication dated Mar. 11, 2013 issued by the State Intellectual Property Office of P.R. China in counterpart Chinese Patent Application No. 200980103346.1.

(56) References Cited

OTHER PUBLICATIONS

Communication dated Oct. 22, 2014 issued by the State Intellectual Property Office of P.R. China in counterpart Chinese Patent Application No. 200980103449.8.
Communication dated Sep. 22, 2014 issued by the Korean Intellectual Property Office in counterpart Korean Patent Application No. 10-2008-0130445.
Communication dated Dec. 31, 2014, issued by the State Intellectual Property Office of P. R. China in counterpart Chinese Application No. 200980103346.1.
Communication dated Mar. 18, 2015, issued by the Korean Intellectual Property Office in counterpart Korean Application No. 10-2010-7014184.
Communication dated Apr. 14, 2015, issued by the Korean Intellectual Property Office in counterpart Korean Application No. 10-2009-7015541.
Communication dated Jun. 1, 2015, issued by the State Intellectual Property Office of P.R. China in counterpart Chinese Application No. 200980103346.1.

* cited by examiner

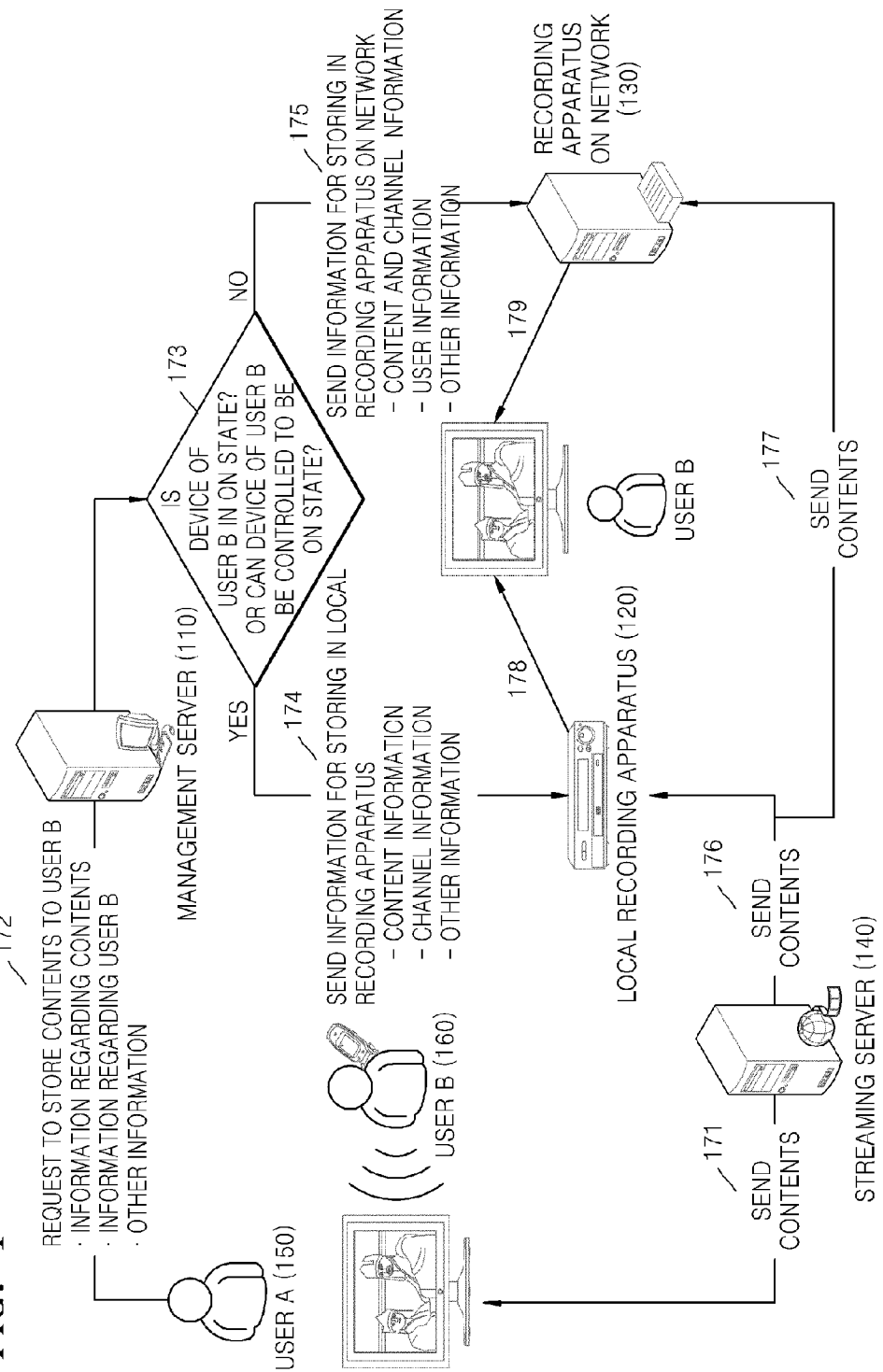

FIG. 2

```
<BuddyRecordDescriptor>
    <Content id="crid://samsung.com/content1">  — 210
        <Title> Matrix </Title>
        <Type> Live </Type>
        <StartTime> PT12H00M00S </StartTime>
        <Duration> PT01H00M00S </Duration>
    </Content>
    <User id="UserB"/>  — 220
    <Protection>  — 230
        <Password> 12345abcdef </Password>
    </Protection>
</BuddyRecordDescriptor>
```

FIG. 3

```
<BuddyRecordDescriptor>
    <Content id="crid://samsung.com/content1">  — 310
        <Title> Matrix </Title>
        <Type> Live </Type>
        <StartTime> PT12H00M00S </StartTime>
        <Duration> PT01H00M00S </Duration>
        <ForcedPlay>rtp://224.10.10.1:3937 </ForcedPlay>
    </Content>
    <User id="UserB"/>  — 320
    <Protection>  — 330
        <Password> 12345abcdef </Password>
    </Protection>
</BuddyRecordDescriptor>
```

ARBITRARILY ADDED PART IN SERVER FOR ADVERTISEMENT SERVICE (390)

CONTENT RECORDING CONTROL METHOD FOR PEERS, AND A DEVICE THEREFOR

CROSS REFERENCE TO RELATED APPLICATION

This application is a National Stage application under 35 U.S.C. §371 of PCT/KR2009/000359 filed on Jan. 23, 2009, which claims the benefit of U.S. Provisional Patent Application No. 61/024,314, filed on Jan. 29, 2008, and U.S. Provisional Patent Application No. 61/026,292, filed on Feb. 5, 2008, all the disclosures of which are incorporated herein in their entireties by reference.

BACKGROUND

1. Field

Apparatuses and methods consistent with exemplary embodiments relate to a method of controlling content recording for a buddy, and more particularly, to a method and apparatus for controlling content recording for a buddy by using a recording apparatus of the buddy or using a recording apparatus on a network.

2. Description of the Related Art

Personal video recorders (PVRs), which may record a broadcasting program selected by a user in a digital storage medium and may reproduce the recorded broadcasting program, has developed in correspondence with developments in digital broadcasting and with increases in capacities of digital storage media, such as a hard disk drive.

PVRs include a local PVR, which records a broadcasting program in a local digital storage medium, and a network personal video recorder (NPVR), which records a broadcasting program in a digital storage medium disposed in a server on a network.

A user can record a broadcasting program by using the local PVR or the NPVR and reproduce the recorded broadcasting program at a time desired by the user or a next user.

However, aside from basic recording and reproducing services provided by the PVR, there is a need for increasing a user convenience by developing solutions to various scenarios.

SUMMARY

Aspects of one or more exemplary embodiments provide a method and apparatus for controlling content recording for a buddy by using a recording apparatus of the buddy or using a recording apparatus on a network in order to record contents for the buddy.

Aspects of one or more exemplary embodiments also provide a computer-readable recording medium having embodied thereon a program for executing the method.

According to an aspect of an exemplary embodiment, there is provided a method of controlling content recording for a buddy of a management server, the method including: receiving a recording request message for the buddy according to an external input; determining whether a local recording apparatus of the buddy is in a recording state; and selectively sending a recording start message to a recording apparatus on a network, different from the local recording apparatus, according to a result of the determining.

The method may further include sending the recording start message to the local recording apparatus of the buddy, when the local recording apparatus of the buddy is in the recording state.

The sending the recording start message to the recording apparatus on the network may include sending the recording start message to the recording apparatus on the network when the local recording apparatus of the buddy is not in the recording state.

The recording request message and the recording start message may include at least one of content information, buddy information, and content password information.

As least one of the recording request message and the recording start message may be in an extensible markup language (XML) format.

The determining whether the local recording apparatus of the buddy is in the recording state may include receiving a state result message indicating whether recording is possible from the local recording apparatus of the buddy in response to a request of the management server.

The request of the management server may be a state check message for checking whether the recording is possible by the local recording apparatus of the buddy.

The method may further include updating the recording start message by using information for providing at least one of a personalized service and an advertisement service for the buddy.

According to an aspect of another exemplary embodiment, there is provided a method of recording, the method including: receiving a recording start message from a management server; recording contents according to the received recording start message; and outputting a list of the recorded contents to a buddy according to an external input.

According to an aspect of another exemplary embodiment, there is provided a computer-readable recording medium having embodied thereon a program for executing the method.

According to an aspect of another exemplary embodiment, there is provided a management server including: a receiving unit which receives a recording request message for a buddy according to an external input; a determining unit which determines whether a local recording apparatus of the buddy is in a recording state; and a recording start unit which selectively sends a recording start message to a recording apparatus on a network according to a result of the determining.

According to an aspect of another exemplary embodiment, there is provided a recording apparatus including: a receiving unit which receives a recording start message from a management server; a recording unit which records contents using the received recording start message; and a content list output unit which outputs a list of recorded contents to a buddy according to an external input.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 1 is a schematic view illustrating a content recording control service for a buddy, according to an exemplary embodiment;

FIG. 2 illustrates a recording request message format and a recording start message format, according to an exemplary embodiment;

FIG. 3 illustrates a recording start message format that is updated to provide an advertisement service, according to an exemplary embodiment;

DETAILED DESCRIPTION OF EXEMPLARY EMBODIMENT

Figure 4:
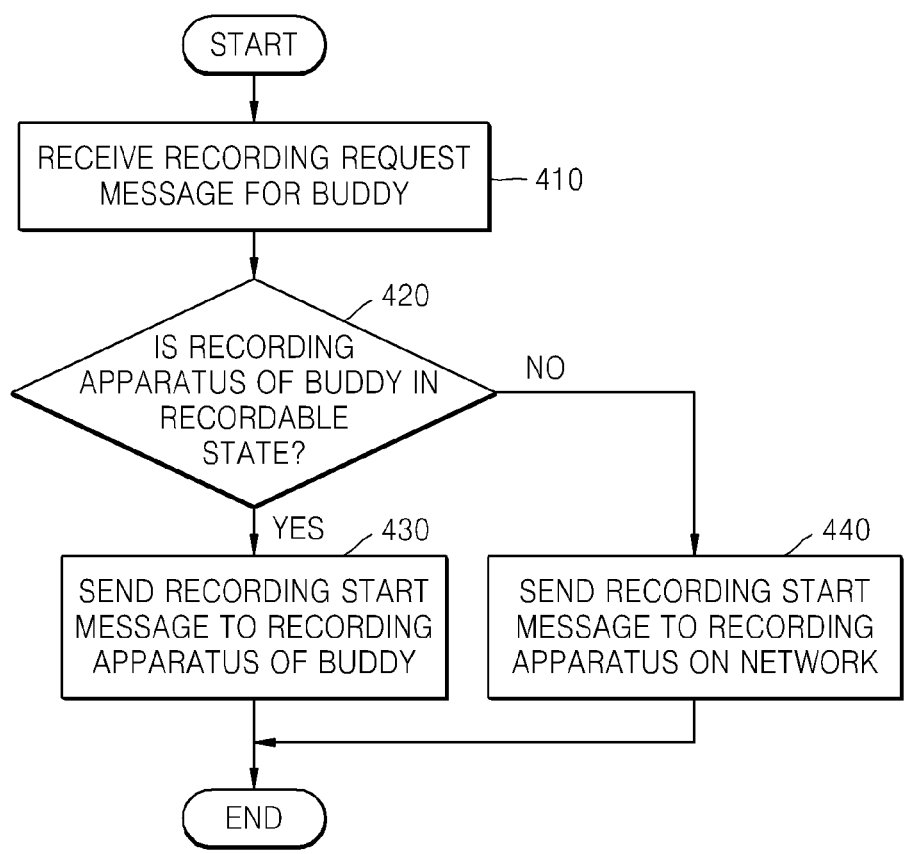
FIG. 4 is a flowchart illustrating a method of controlling content recording for a buddy of a management server, according to an exemplary embodiment.

Hereinafter, exemplary embodiments will be described in detail with reference to the attached drawings. The same reference numerals in the drawings denote the same element throughout. Furthermore, in the drawings, thicknesses of layers and regions are exaggerated for clarity. Also, it is understood that expressions such as "at least one of," when preceding a list of elements, modify the entire list of elements and do not modify the individual elements of the list.

FIG. 1 is a schematic view illustrating a content recording control service for a buddy, according to an exemplary embodiment. Referring to FIG. 1, the content recording control service includes a management server 110 on a network, a streaming server 140, a recording apparatus on a network 130, and a local recording apparatus 120.

The recording apparatus on the network 130 is a network personal video recorder (NPVR) that records a broadcasting program in a digital storage medium disposed in a server on the network. The local recording apparatus 120 is a local personal video recorder (PVR) that records a broadcasting program in a local digital storage medium. The recording apparatus 130 and the local recording apparatus 120 may be different apparatuses.

The management server 110 controls the local recording apparatus 120 and the recording apparatus on the network 130 in order to record contents for a buddy. The streaming server 140 provides a digital broadcasting program in real time. Hereinafter, operations of the content recording control service for a buddy according to an exemplary embodiment will be described below with reference to FIG. 1.

Referring to FIG. 1, while a first user A 150 is watching a broadcasting program provided by the streaming server 140 (operation 171), the first user A 150 may receive a request to record a specific channel that is presently on air from a buddy (i.e., a second user B) 160. Accordingly, the first user A 150 sends at least one of desired content information, buddy information, content password information pertaining to the buddy 160 to the management server 110, etc. (operation 172).

The management server 110 determines whether the local recording apparatus 120 of the buddy 160 is in a recording state (e.g., whether the local recording apparatus 120 of the buddy is powered on) (operation 173).

When the local recording apparatus 120 of the buddy 160 is in the recording state, the management server 110 sends a recording start message including at least one of the content information, the buddy information, the content password information, etc., to the local recording apparatus 120 of the buddy 160 (operation 174). The local recording apparatus 120 of the buddy 160 records contents aired on the corresponding channel according to the recording start message received from the management server 110 (operation 176).

Afterwards, when the buddy 160 desires to reproduce the contents aired on the recorded channel, the local recording apparatus 120 of the buddy 160 outputs a list of the contents recorded for the buddy 160 and reproduces selected contents (operation 178).

When the local recording apparatus 120 of the buddy 160 is not in the recording state, the management server 110 sends a recording start message including at least one of the content information, the buddy information, the content password information, etc., to the recording apparatus on the network 130 (operation 175). The recording apparatus on the network 130 records contents aired on the corresponding channel according to the recording start message received from the management server 110 (operation 177).

Afterwards, when the buddy 160 desires to reproduce the contents aired on the recorded channel, the recording apparatus on the network 130 outputs a list of contents recorded for the buddy 160 and reproduces selected contents (operation 179).

According to the present exemplary embodiment, content recording and reproducing for a first user A are possible by using a recording apparatus, and content recording and reproducing for a buddy 160 are also possible. Thus, user convenience may be increased in terms of availability of the recording apparatus.

Moreover, according to another exemplary embodiment, the management server 110 updates a recording start message by using information for providing a personalized service and an advertisement service for the buddy 160, and sends the updated recording start message to the local recording apparatus 120 of the buddy 160 or the recording apparatus on the network 130. The local recording apparatus 120 or the recording apparatus on the network 130 that receives the updated recording start message may receive the personalized service and the advertisement service through information that is specified to provide the personalized service and the advertisement service before, during, or after reproducing the contents.

According to the present exemplary embodiment, content recording and reproducing service for a buddy 160 may be provided, and a personalized service and an advertisement service for a buddy 160 may also be provided. Thus, user convenience and service quality may be increased in providing and using contents.

FIG. 2 illustrates a recording request message format and a recording start message format, according to an exemplary embodiment. In the present exemplary embodiment, the recording request message is sent from a first user A 150 to a management server 110 in order to request recording of contents for a buddy 160. The recording start message is sent from the management server 110 to a local recording apparatus 120 or a recording apparatus on a network 130 in order to control the local recording apparatus 120 or the recording apparatus on the network 130 to perform recording of the contents.

Referring to FIG. 2, the recording request message and the recording start message include content information 210, buddy information 220, and content password information 230. Although the recording request message and the recording start message of the present exemplary embodiment are provided in an extensible markup language (XML) format, it is understood that at least one of the recording request message and the recording start message may be provided in another format in one or more other exemplary embodiments. As illustrated in FIG. 2, the content information 210 includes a title, a type, a real-time broadcasting time, and a duration time of content. The buddy information 220 includes identifier information of the buddy 160. The content password information 230 includes password information for reproducing contents.

FIG. 3 illustrates a recording start message format that is updated to provide an advertisement service, according to an exemplary embodiment. In the present exemplary embodiment, when a local recording apparatus 120 or a recording apparatus on a network 130 reproduces contents for a buddy 160, a management server 110 may update a recording start message so as to include information to provide a personalized service and an advertisement service for the buddy 160.

Referring to FIG. 3, the recording start message format includes information 390 that is added to provide the advertisement service for the buddy 160. The local recording apparatus 120 or the recording apparatus on the network 130 that receives the updated recording start message receives the advertisement service from an advertisement site specified by location information (e.g., a uniform resource locator (URL)) before, during, or after reproducing the contents.

FIG. 4 is a flowchart illustrating a method of controlling content recording for a buddy 160 of a management server 110, according to an exemplary embodiment. Referring to FIG. 4, in operation 410, the management server 110 receives a recording request message for the buddy 160 by an external input.

In operation 420, the management server 110 determines whether a local recording apparatus 120 of the buddy 160 is in a recording state. When the local recording apparatus 120 of the buddy 160 is in the recording state, the method proceeds to operation 430, and when the local recording apparatus 120 of the buddy 160 is not in the recording state, the method proceeds to operation 440. For example, the management server 110 sends a state check message for checking whether recording is possible to the local recording apparatus 120 of the buddy 160 and, in response, receives a state result message indicating whether recording is possible. Accordingly, the management server 110 determines whether the local recording apparatus 120 of the buddy 160 is in the recording state. A real time transport protocol (RTSP) ANNOUNCE message and a corresponding response message or other types of messages may be used as a state check message and a state result message in various exemplary embodiments.

Operation 430 is performed when the local recording apparatus 120 of the buddy 160 is in the recording state. In operation 430, the management server 110 sends a recording start message to the local recording apparatus 120 of the buddy 160.

Operation 440 is performed when the local recording apparatus 120 of the buddy 160 is not in the recording state. In operation 440, the management server 110 sends a recording start message to the recording apparatus on the network 130.

The recording request message and the recording start message include at least one of content information, buddy information, content password information, etc. Furthermore, the recording request message and the recording start message may be in an XML format and may be sent using hypertext transfer protocol (HTTP), though it is understood that other exemplary embodiments are not limited thereto. That is, according to another exemplary embodiment, at least one of the recording request message and the recording start message may be in another format, other than XML, and may be sent using another protocol, other than HTTP.

Moreover, according to another exemplary embodiment, the management server 110 updates the recording start message by using information for providing a personalized service for the buddy 160 and an advertisement service, and sends the updated recording start message to the local recording apparatus 120 of the buddy 160 or the recording apparatus on the network 130.

Figure 5:
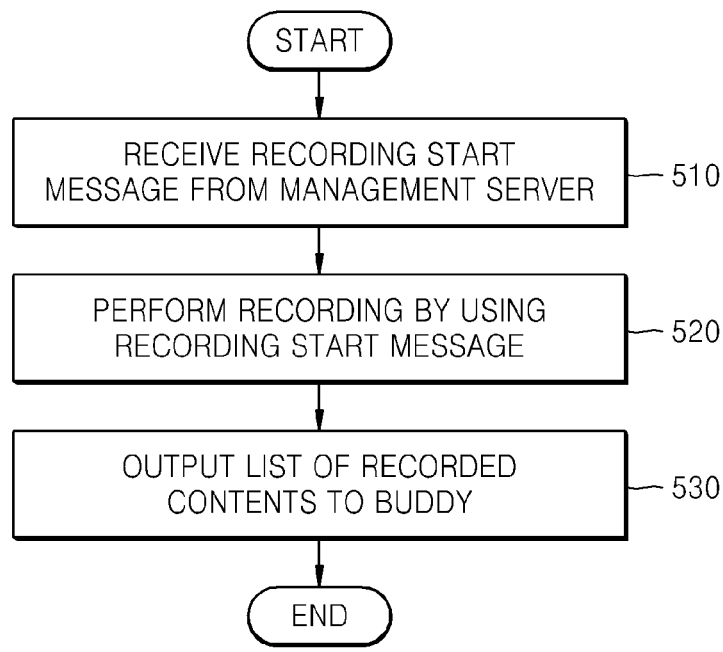
FIG. 5 is a flowchart illustrating a recording process of a recording apparatus, according to an exemplary embodiment.

FIG. 5 is a flowchart illustrating a recording process of a local recording apparatus 120 and a recording apparatus on a network 130, according to an exemplary embodiment. Referring to FIG. 5, in operation 510, the local recording apparatus 120 and the recording apparatus on the network 130 receive a recording start message from a management server 110. The recording start message includes at least one of content information, buddy information, content password information, etc. For example, the local recording apparatus 120 and the recording apparatus on the network 130 may store the received content password information.

In operation 520, the local recording apparatus 120 and the recording apparatus on the network 130 perform recording by using the received recording start message.

When a user desires to reproduce recorded contents, the local recording apparatus 120 and the recording apparatus on the network 130 output a list of the recorded contents to the buddy 160 according to an external input. In this case, the local recording apparatus 120 and the recording apparatus on the network 130 may receive a request for specific contents and content password information from the buddy 160, and reproduces the requested contents accordingly.

Figure 6:
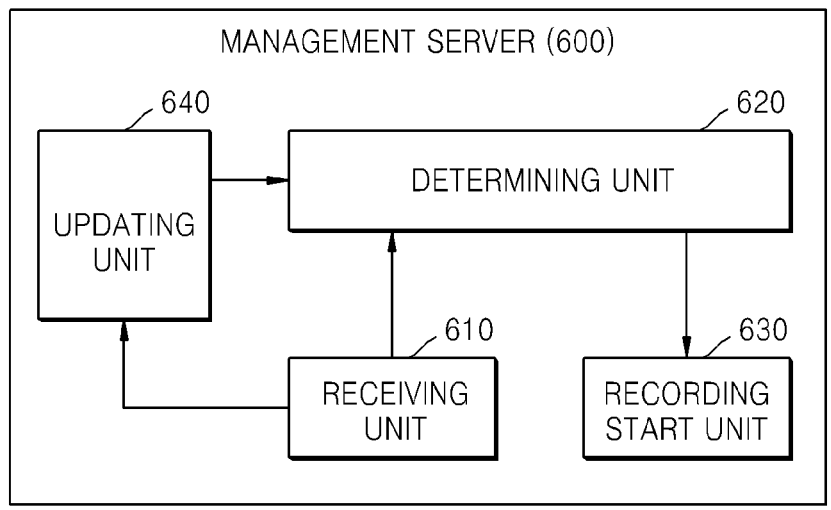
FIG. 6 is a block diagram of a management server for controlling content recording for a buddy, according to an exemplary embodiment.

FIG. 6 is a block diagram of a management server 600 for controlling content recording for a buddy 160, according to an exemplary embodiment. Referring to FIG. 6, the management server 600 includes a receiving unit 610, a determining unit 620, a recording start unit 630, and an updating unit 640.

The receiving unit 610 receives a recording request message for the buddy 160 by an external input.

The determining unit 620 determines whether a local recording apparatus 120 of the buddy 160 is in a recording state. For example, the determining unit 620 sends a state check message for checking whether recording is possible to the local recording apparatus 120 of the buddy 160 and, in response, receives a state result message indicating whether recording is possible from the local recording apparatus 120 of the buddy 160. Accordingly, the management server 600 determines whether the local recording apparatus 120 of the buddy 160 is in the recording state.

When the local recording apparatus 120 of the buddy 160 is in the recording state, the recording start unit 630 sends a recording start message to the local recording apparatus 120 of the buddy 160. Conversely, when the local recording apparatus 120 is not in the recording state, the recording start unit 630 sends a recording start message to a recording apparatus on a network 130.

The recording request message and the recording start message include at least one of content information, buddy information, content password information, etc. The recording request message and the recording start message may be in an XML format and may be sent using HTTP, though it is understood that other exemplary embodiments are not limited thereto. That is, according to another exemplary embodiment, at least one of the recording request message and the recording start message may be in another format, other than XML, and may be sent using another protocol, other than HTTP.

The updating unit 640 updates the recording start message by using information for providing a personalized service and an advertisement service for the buddy 160. The recording start unit 630 sends the updated recording start message to the local recording apparatus 120 of the buddy 160 or the recording apparatus on the network 130.

Figure 7:
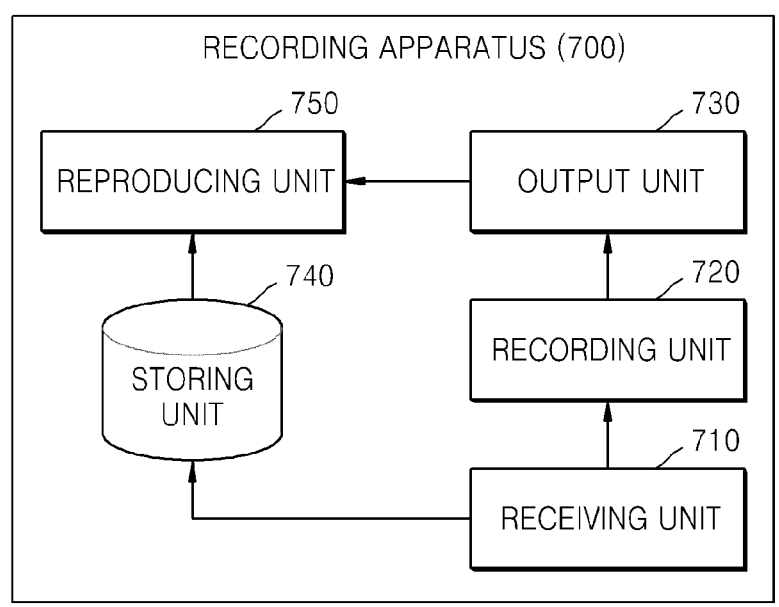
FIG. 7 is a block diagram of a recording apparatus for recording contents for a buddy, according to an exemplary embodiment.

FIG. 7 is a block diagram of a recording apparatus 700 for recording contents for a buddy 160, according to an exemplary embodiment. Referring to FIG. 7, the recording apparatus 700 includes a receiving unit 710, a recording unit 720, an output unit 730, a storing unit 740, and a reproducing unit 750.

The receiving unit 710 receives a recording start message from a management server 110. The recording start message includes at least one of content information, buddy information, content password information, etc.

The recording unit 720 performs recording of contents by using the received recording start message.

When a user desires to reproduce the recorded contents, the output unit 730 outputs a list of the recorded contents to the buddy 160 according to an external input.

The storing unit 740 may store the content password information included in the recording start message sent to the receiving unit 710.

The reproducing unit 750 receives a request for specific contents from the output list of contents and the content password information and reproduces the contents accordingly.

While not restricted thereto, exemplary embodiments can be written as computer readable codes on a computer readable recording medium. The computer readable recording medium is any data storage device that can store data that can be thereafter read by a computer system. A computer readable medium can be transitory or non-transitory. Examples of the non-transitory computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, exemplary embodiments may be written as computer programs transmitted over a computer-readable transmission medium (e.g., transitory medium), such as a carrier wave, and received and implemented in general-use or special-purpose digital computers that execute the programs.

While exemplary embodiments have been particularly shown and described with reference to the drawings, it will be understood by one of ordinary skill in the art that various changes in form and details may be made therein without departing from the spirit and scope of the present inventive concept as defined by the following claims. The above-described exemplary embodiments should be considered in a descriptive sense only and not for purposes of limitation. Therefore, the scope of the prevent inventive concept is defined not by the detailed description of the exemplary embodiments, but by the appended claims, and all differences within the scope will be construed as being included in the present inventive concept.

The invention claimed is:

1. A method of controlling by a management server, for recording of contents, the method comprising:
   receiving, by the management server, a recording request message for a second user from a user device of a first user;
   determining whether a local recording apparatus of the second user, different from the user device of the first user, is in a recording available state in which the local recording apparatus of the second user is able to record the contents;
   sending, to the local recording apparatus, a recording start message when the local recording apparatus is determined to be in the recording available state, and
   sending, to a network recording apparatus, a recording start message when the local recording apparatus is determined to not be in the recording available state;
   wherein the local recording apparatus is different from the network recording apparatus.

2. The method of claim 1, wherein the recording request message comprises an identifier of the second user, and
   the local recording apparatus of the second user is a local recording apparatus corresponding to the identifier of the second user.

3. The method of claim 1, wherein the recording request message and the recording start message comprise at least one of content information, information on the second user, and content password information.

4. The method of claim 3, wherein at least one of the recording request message and the recording start message is in an extensible markup language (XML) format.

5. The method of claim 1, wherein the determining whether the local recording apparatus of the second user is in the recording available state comprises receiving, from the local recording apparatus of the second user, a state result message indicating whether the local recording apparatus of the second user can record the contents in response to a request of the management server.

6. The method of claim 5, wherein the request of the management server is a state check message, transmitted from the management server to the local recording apparatus of the second user, for checking whether the local recording apparatus of the second user can record the contents.

7. The method of claim 1, further comprising updating the recording start message by using information for providing at least one of a personalized service and an advertisement service for the second user.

8. A management server for controlling of recording of contents, the management server comprising:
   a receiving unit which receives a recording request message for a second user from a user device of a first user;
   a determining unit which determines whether a local recording apparatus of the second user, different from the user device of the first user, is in a recording available state in which the local recording apparatus of the second user is able to record the contents; and
   a recording start unit which
      sends, to the local recording apparatus, a recording start message when the local recording apparatus is determined to be in the recording available state, and
      sends, to a network recording apparatus, the recording start message when the local recording apparatus is determined to not be in the recording available state,
   wherein the local recording apparatus is different from the network recording apparatus.

9. The management server of claim 8, wherein the recording request message comprises an identifier of the second user, and
   the local recording apparatus of the second user is a local recording apparatus corresponding to the identifier of the second user.

10. The management server of claim 8, wherein the recording request message and the recording start message comprise at least one of content information, information on the second user, and content password information.

11. The management server of claim 10, wherein at least one of the recording request message and the recording start message are in an extensible markup language (XML) format.

12. The management server of claim 8, wherein the determining unit receives, from the local recording apparatus of the second user, a state result message indicating whether the local recording apparatus of the second user can record the contents in response to a request of the management server.

13. The management server of claim 12, wherein the request of the management server is a state check message for checking whether the local recording apparatus of the second user can record the contents.

14. The management server of claim 8, further comprising an updating unit which updates the recording start message by using information for providing at least one of a personalized service and an advertisement service for the second user.

15. A non-transitory computer-readable recording medium having embodied thereon a program for executing the method of claim 1.

* * * * *